Patented Jan. 9, 1940

2,186,609

UNITED STATES PATENT OFFICE 2,186,609

METHOD OF REMOVING WAX FROM WAXED PAPER STOCK

Otto Kress, Appleton, Wis., assignor to The Institute of Paper Chemistry, Neenah, Wis., a corporation of Wisconsin No Drawing. Application May 5, 1937,
Serial No. 140,835

10 Claims. (Cl. 92—3)

The present invention relates to waxed paper and more in particular to an improved method for removing wax and like materials from treated paper so as to recover the paper stock together with the wax and like materials.

Many papers in use today, such as bread wrap, other food wraps, drinking cup stock, etc., are coated or impregnated with wax, oil, or like materials. At the present time, broke coated or impregnated with waxy compositions is generally disposed of by burning, although some of it is sold at an extremely low price for use as confetti, furniture wrap, and the like. It has long been recognized that it would be far more economical to recover both the paper stock and the waxy materials, and numerous methods have been proposed for de-waxing the waste paper. The prior methods, the majority of which depend upon the melting of the waxy materials from the paper with hot water, have not been found satisfactory as they leave about 10 per cent of the coating or impregnating compositions in the treated broke, which is more than sufficient to cause trouble, e. g., gumming up on the paper machine. Other methods for the removal of wax, such as extraction methods using volatile solvents, have, in general, been found too expensive in view of the relatively low cost of the raw and finished materials.

It is, therefore, an object of my invention to provide a practical method for the complete removal of wax and like materials from paper.

It is another object of my invention to provide an economical method for de-waxing papers so as to produce paper stock suitable for use on the paper machine.

It is a further object of my invention to provide a method for recovering wax and like materials from coated and impregnated papers.

Other objects will be apparent as the description hereinafter proceeds.

In accordance with my method, the greater portion of the waxy materials are first removed by placing the paper in shredded form in a tank partially filled with water and provided with a suitable agitator and a live steam inlet. The steam inlet provides a means for heating the whole mass to a temperature above the melting point of the coating or impregnating material. As the waxy materials generally employed for treating paper have a melting point of about 124° to 135° F., a temperature in the tank of about 160° F. is ordinarily sufficient. However, in some types of saturated papers such as, for example, oiled papers, lower temperatures will, of course, be sufficient to melt out the oil. In all cases, depending upon the nature of the impregnating compound, whether oily or waxy, the temperature may be varied to suit the melting point of the impregnating compound employed in the original sheet. Under these conditions, when live steam is admitted into the tank, the bulk of the waxy material is melted from the paper and rises to the surface where it may be separated by mechanical means by use of a suitable screen. The melted waxy material and excess water overflow from the tank into a receptacle in which the water-insoluble waxy material may be separated by any suitable means. If desired, the hot water in the receptacle freed from the coating or impregnating material may be pumped into the treating tank to provide the necessary volume of excess hot water required to overflow the waxy materials. By this initial treatment the bulk of the waxy material, or about 90 per cent of the amount originally present in the coated or impregnated paper, is removed. Another method which I have found to be suitable for the removal of the major portion of the wax is to reduce the waxed broke to a pulp condition in a steam-heated hollander or other type of beater, the contents of the same being held at a temperature above the melting point of the wax. When the stock is completely de-fibered, the bulk of the wax, amounting to about 90 per cent of the original wax content, is removed by a washer; the balance of the wax, which is left with the stock and is approximately 10 per cent of the original wax content, is emulsified according to the procedure as described hereinafter. Naturally, other mechanical means for de-fibering and removing the bulk of the wax may be employed, the two methods already described being given simply as typical examples of methods that might be used.

I have discovered that it is possible to remove, by emulsification, the remaining or residual waxy material in the paper stock, which has become divellicated or de-fibered through the action of the hot water, by treating the fibers with a mixture of water-insoluble, alkali-soluble, acid-precipitable protein such as casein dissolved in an alkali and soap. The protein is usually cut with about 5 per cent of caustic based on the weight of the protein or about 7 per cent of sodium carbonate or any other alkali, a sufficient amount being used to dissolve the water-insoluble, alkali-soluble, acid-precipitable protein. The soap which may be used in varying amounts is the emulsifying agent and is preferably of the nature of ammonium oleate, although any other suitable emulsifying agent may be employed. The residual waxy material retained in the fibers after the initial treatment is removed by emulsification, which may be secured by means of high speed agitation, by means of pumping the stock from the tank through a centrifugal pump, or by any other suitable means which will provide sufficient agitation to emulsify the residual coating or impregnating materials. I have found that even relatively slow speed agitation through the use of finely divided low pressure air, admitted through a suitable coil at the bottom of the treating tank, is sufficient to give good emulsification. The waxy emulsions formed are stable and are similar to the emulsions described in the Kress and Johnson copending application Serial No. 76,008, filed April 23, 1936, which is a continuation in part of application Serial No. 3,807, patented October 20, 1936, No. 2,058,085.

The de-fibered stock from which the waxy material has been removed by emulsification may be separated from the emulsion by any suitable means such, for example, as on the ordinary wet machine. In addition, the stock may be washed by any of the well known methods, such as screens, washers, etc., commonly employed to separate, at least in part, the water from a stock suspension. The treated pulp free from the waxy materials may be used at the mill or shipped as lap to wherever desired. The liquors containing the emulsified wax or like material may be used as size for the treated pulp or any other pulp as desired. If the emulsion is to be used as sizing for the treated stock or filler, the stock, together with the liquor containing the wax emulsion, may be pumped to a beater or other suitable container where the emulsion may be broken by the addition of acidic material, such as alum, as fully described in copending application Serial No. 71,184, filed March 27, 1936, of which I am a co-inventor, and in prior Kress and Johnson Patents No. 2,058,085, No. 2,059,464, and No. 2,059,465.

The protein compositions to be used in my process are water-insoluble, alkali-soluble, and acid-precipitable proteins such as casein, soya bean protein, and the like. I prefer to employ soap emulsifying agents such as ammonium oleate, although other emulsifying agents such as Turkey red oil, sulfonated oils, triethanolamine, and the like may be used. My process is particularly adaptable for removing hydrocarbon waxy materials such as the various type paraffins from paper stock. In addition, my process may be employed to remove pitch from pitchy pulp. In general, I have discovered that my process may be utilized to remove from cellulose fibers all water-insoluble coating and impregnating materials or compositions of a waxy, oily, or pitchy nature, and the term "waxy materials" used throughout the specification and claims is intended to cover all materials and compositions of this type.

When the liquor containing the emulsified waxy material is to be used for sizing of the paper, or sizing the filler to be used in paper, it has been found advisable to have a soap-protein ratio of about 1:1 to 1:4 and to have a protein-wax ratio of about 1:1 to 1:4. The use of a smaller amount of protein increases the danger of wax spots in the finished paper when the emulsion is broken and the waxy material precipitated. In some instances a high protein-wax ratio of 1:2 is desired, although for ordinary practice a 1:3 or 1:3.5 protein-wax ratio has proven satisfactory. However, to obtain complete emulsification of the residual waxy or oily materials and particularly when the emulsion is to be used as sizing, I prefer to have a protein-soap-wax ratio of 1:1:1. The amount of waxy material in the broke and the amount of protein and soap or other emulsifying agent necessary can, of course, be determined by simple experimental tests.

If the paper stock loses some of its brightness during the treatment, or if colored waxed broke is used, the broke may be bleached according to standard practice. In addition, if the waxy materials are off color, they also may be purified by standard methods such as filtration or by treatment with standard materials such as fuller's earth, and the like.

My process also provides for the recovery of pigments and fillers such as titanium dioxide from opaque coated and impregnated paper. The pigments and fillers may be recovered by settling the white water from the wet machine, or in case the stock is to go directly back to the paper machine in the same mill, all of the pigments and fillers originally present may be retained with the treated broke.

It will be seen that my process provides a means for recovering the relatively expensive waxy and like materials and, in addition, provides a means for using the residual coating and impregnating materials as sizing. As the treated or purified pulp has a value which is several times that of the original waste paper, it will be apparent that my process is also economical and one long desired in the paper industry.

It will be understood by those skilled in the art that all of the waxy materials may be removed from the broke by emulsification, although I prefer to remove the bulk of the waxy or oily materials by the preliminary hot water or steam treatment. It will also be understood by those skilled in the art that my invention is not limited to the specific process and materials above described. All variations coming within the true spirit and scope of my invention are intended to be covered by the claims appended hereto.

I claim:

1. The method of separating waxy materials from waxed paper stock, which comprises defibering the stock in an aqueous medium, adding to the fibers an aqueous mixture consisting of a water-soluble emulsifying agent and an alkali solution of a water-insoluble, alkali-soluble, acid-precipitable protein, agitating the mass so as to form a stable emulsion of said waxy materials and separating the emulsion from the defibered stock, whereby there is produced substantially wax-free fibers.

2. The method of removing wax from wax coated or impregnated paper stock, which comprises defibering the stock in a heated aqueous medium, adding to the fibers an aqueous mixture consisting of a water-soluble emulsifying agent and an alkali solution of casein, agitating the mass so as to form a stable emulsion of said wax or like materials and removing the emulsion from the fibers, whereby there is produced substantially wax-free fibers.

3. The step in the method of de-waxing waxed paper stock, which comprises substantially completely removing the residual waxy materials from the fibers of de-fibered paper stock by agitation of the stock in an aqueous medium containing ammonium oleate and an alkali solution of soya bean protein.

4. The step in the method of de-waxing waxed paper stock, which comprises substantially completely removing the residual waxy material from the fibers of divellicated paper stock by agitation of the stock in an aqueous medium consisting of a soap emulsifying agent and an alkali solution of a water-insoluble, alkali-soluble, acid-precipitable protein.

5. The method of removing paraffin from the fibers of paraffin coated or impregnated paper stock, which comprises de-fibering the stock in an aqueous medium, adding to the fibers an aqueous mixture consisting of a water-soluble emulsifying agent and an alkali solution of a water-insoluble, alkali-soluble, acid-precipitable protein, agitating the mass so as to form an emulsion of said paraffin and separating the emulsion from the defibered stock, whereby there is produced substantially wax-free fibers.

6. The method of removing waxy material from the fibers of waxed paper stock and forming a stable wax emulsion for sizing of paper, which comprises de-fibering the stock in an aqueous medium, adding to the fibers an aqueous mixture consisting of a water-soluble emulsifying agent and an alkali solution of a water-insoluble, alkali-soluble, acid-precipitable protein, agitating the mass so as to form an emulsion of said waxy materials, the ratio of protein to wax being at least about 1:4 and separating the emulsion from the defibered stock, whereby there is produced substantially wax-free fibers and a paper sizing emulsion.

7. The method of removing waxy material from the fibers of waxed paper stock and forming a stable wax emulsion for use as sizing material, which comprises de-fibering stock in an aqueous medium, adding to the fibers an aqueous mixture consisting of a soap emulsifying agent and an alkali solution of a water-insoluble, alkali-soluble, acid-precipitable protein, agitating the mass so as to form a stable emulsion of said waxy material, the ratio of soap to protein being 1:1 to 1:4, and the ratio of protein to wax being 1:1 to 1:4 and separating the emulsion from the defibered stock, whereby there is produced substantially wax-free fibers and a paper sizing emulsion.

8. The method of removing water-insoluble waxy materials from the fibers of waxed paper stock, which comprises removing the bulk of the waxy material by agitation of the stock in an aqueous medium heated to a temperature above the melting point of said waxy material, and substantially completely removing the residual waxy material by further agitation of the stock in an aqueous medium consisting of a water-soluble emulsifying agent and an alkali solution of a water-insoluble, alkali-soluble, acid-precipitable protein.

9. The method of removing water-insoluble waxy material from waxed paper stock, which comprises removing the bulk of the waxy material by agitation of the stock in shredded form in an aqueous medium heated to a temperature above the melting point of said waxy material, separating the melted waxy material from the stock, and substantially completely removing the residual waxy material by further agitation of the stock in de-fibered form in an aqueous medium consisting of a soap emulsifying agent and an alkali solution of casein.

10. The method of removing water-insoluble waxy materials from waxed paper stock, which comprises placing the stock in shredded form in a container partially filled with water, heating the water in said container above the melting point of the waxy materials by means of live steam, agitating the heated mass so as to divellicate the stock, separating from the fibers the waxy materials melted from the stock, and substantially completely removing from the divellicated stock the residual waxy materials not removed by the hot water treatment by additional agitation of the stock in an aqueous medium consisting of a water-soluble emulsifying agent and an alkali solution of a protein which is water-insoluble, alkali-soluble, and acid-precipitable.

OTTO KRESS.